Feb. 11, 1964
H. J. KAZIENKO
3,120,967
COATED GROOVES FOR PIPE COUPLING
Original Filed May 16, 1958
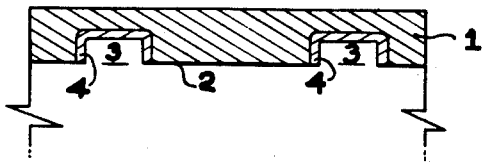
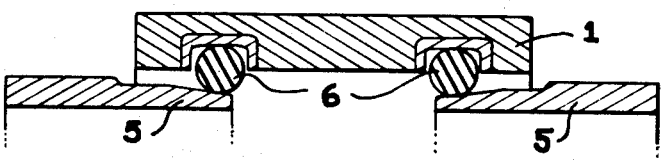
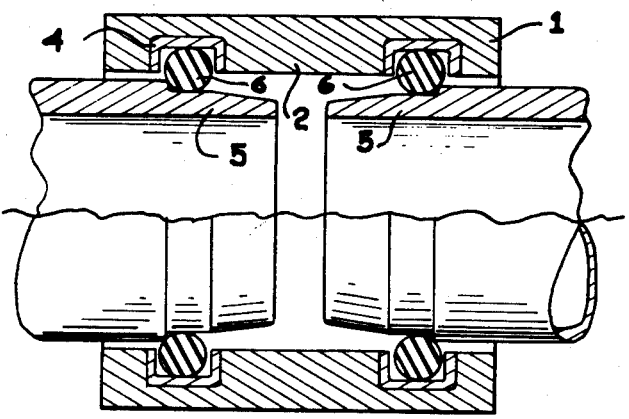
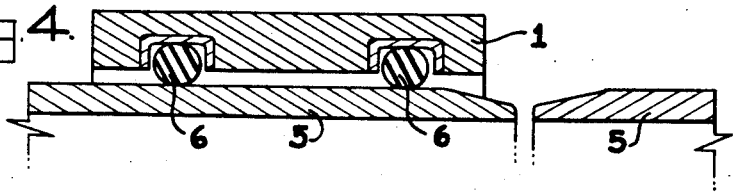
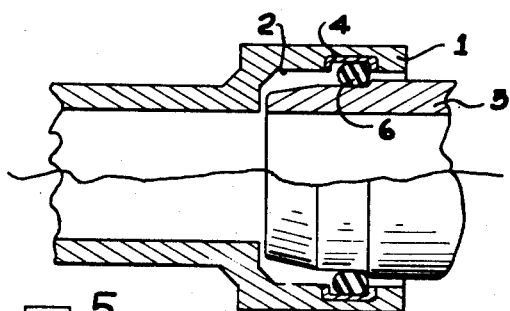
INVENTOR.
HENRY J. KAZIENKO
BY
ATTORNEY

3,120,967
COATED GROOVES FOR PIPE COUPLING
Henry J. Kazienko, Somerset, N.J., assignor to Johns-Manville Corporation, New York, N.Y., a corporation of New York
Continuation of application Ser. No. 735,717, May 16, 1958. This application Aug. 14, 1961, Ser. No. 131,338
8 Claims. (Cl. 285—231)

This invention relates to pipe couplings and their method of assembly. While the invention has utility with many types of pipe, for example, steel or iron pipe, it is particularly adapted for use in the connecting of pipe sections composed of a hardened, compressed fibro-cement composition, and, more particularly, where a completely non-metallic coupling comprising sections of asbestos-cement pipe is desired. The features of the invention have application both in couplings for so-called "pressure" pipe, and "non-pressure" pipe designed for operation at desired pressures. The novel features of the invention may be utilized effectively on bell and spigot type couplings but provide particular advantages in sleeve type couplings which permit the removal or replacement of pipe sections or the tapping into a line when desired. Therefore, it is intended that the word coupling, as used herein, include all types of joints between adjacent pipes or units. This application is a continuation of copending application Serial No. 735,717 filed May 16, 1958, and now abandoned.

The types of coupling particularly referred to are fully explained in the U.S. patent to Heisler, Patent No. 2,738,992 issued March 20, 1956. A problem occurring in the field installation of such types of coupling is that the rings are sometimes displaced from the grooves as the coupling is completed. The major cause of such trouble resides in the improper lubrication of the mating parts. As the pipe end is inserted into the coupling, it comes into contact with the gasket, which typically comprises an O-ring having a generally circular cross-sectional configuration in its relaxed condition, and, as it continues to move inwardly, urges the gasket into contact with the restraining wall of the groove in which the gasket is seated. If a section of the pipe end has been improperly lubricated, the pipe end will exert sufficient forces on the gasket to move at least a portion of the gasket out of the groove with the continued movement of the pipe. As a result of this movement with the pipe end, that portion of the gasket will be displaced longitudinally of the coupling so that all of the gasket will no longer lie substantially in a common plane perpendicular to the longitudinal axis of the coupling. This movement of a portion of the gasket with the pipe end is due primarily to the relatively high frictional forces between the gasket, which in most instances is a rubber ring, and the unlubricated portion of the pipe end. The result of such a displaced ring is a leak that occurs when the asbestos-cement pipe is placed under pressure. In normal instances, the leak due to the displaced ring is not apparent during the initial pipeline hydrostatic test. The leak due to the displaced ring may not develop and cause trouble until after the pipeline has been in service for a period of time. The repairs required by such failures to an existing pipeline are extremely expensive. Since it is most improbable that human error can be entirely eliminated in the assembly of such pipe couplings, it is necessary to design a foolproof assembly for the joint.

It is an object of this invention to overcome the difficulties noted above by providing a coupling in which the tendency for the rings to become displaced is virtually eliminated.

It is a further object of this invention to provide a coupling in which the rings may rotate within the grooves in the coupling.

In accordance with the instant invention, a coupling is provided for asbestos-cement pipe in which the coupling grooves are provided with a coating, the material of which has a coefficient of friction that is lower than the coefficient of friction of the material in the pipe or in the coupling. The coating on the surface of the grooves allows the rings to rotate within the coupling groove. Since the ring is permitted to rotate within the groove, there is little or no tendency for the ring to be displaced from the groove.

The invention will be more fully understood and further objects and advantages thereof will become apparent when reference is made to the following detailed description of a preferred embodiment of the invention and the accompanying drawings in which:

FIG. 1 is a sectional view of a coupling sleeve taken on a plane passing through the longitudinal axis with only the upper portion of the coupling sleeve being shown;

FIG. 2 is a sectional view taken on a plane passing through the common longitudinal axis of adjacent pipe ends and a sleeve type coupling in a pre-assembly position with only the upper portion of the elements being shown;

FIG. 3 is a view with parts in section of an assembled pipe and coupling;

FIG. 4 is a sectional view taken on a plane passing through the common longitudinal axis of a pipe end and a sleeve type coupling in another type of pre-assembly position with only the upper portion of the elements being shown; and FIG. 5 is a view with parts in section of a bell and spigot type coupling.

Referring to the drawing, there is disclosed in FIG. 1 a hollow sleeve type coupling 1 having a generally cylindrical body. The inner surface 2 of the coupling 1 is provided with a pair of spaced annular grooves 3. In accordance with the instant invention, the surface of each groove 3 is coated with a material 4 having a coefficeint of friction which is substantially lower than the coefficient of friction of the material in the coupling 1. The material 4 should be of such a nature to provide a substantially rigid and permanent coating on the surface of the grooves 3. As illustrated in the drawing, the thickness of the coating is greatly exaggerated.

In FIG. 2, there is disclosed the coupling 1 in one pre-assembled position adapted to receive the pipe ends 5. A rubber ring 6, of the type described in the Heisler patent, supra, is in each groove 3. The ends 5 of the pipe are inserted into the coupling 1 with the ends 5 fitting within the rings 6 so that the rings 6 are compressed between the outer surface of the pipe ends 5 and the coupling 1 as the ends of the pipe move together. The width of the grooves 3 is greater than the axial width of the rings 6 in their deformed state as viewed in FIG. 3.

The coupling is prepared for assembly by applying a suitable lubricant either to the surface of the groove 3 or to the ring 6. The rings 6 are then inserted into the grooves 3 and the pipe ends 5 are brought into proper position. The pipe ends 5 are introduced into the coupling 1 and within the rings 6 and urged toward each other. As the ends of the pipe approach each other, the rings 6 are compressed between the outer surface of the pipe ends 5 and the coupling 1 to form a fluid tight seal. The coating 4 on the grooves 3 allows the rings 6 to rotate in the grooves 3 as the pipe ends 5 move toward each other. This function of allowing the rings 6 to rotate within the grooves 3 eliminates the tendency for the rings 6 to be displaced from the grooves 3. It is to be noted that the instant invention may be used with various types of joints some of which are illustrated in FIGS. 2, 4 and 5, and including joints in which the annular grooves are located on the outer periphery of the inside or inner pipe end or ends rather than on the inner periphery or circumference of the outside sleeve or bell or the like coupling element.

It is to be particularly noted that each annular groove 3 is to be coated with a material 4 having a coefficient of friction substantially lower than the coefficient of friction of the material in the pipe and in the coupling. The coating can be of any material having a nature that provides a relatively thin coating of a permanent characteristic to provide for the desired action of the O-ring coupling. Various attempts to prevent the displacement of the rings by providing the pipe ends with a coating of material having a coefficient of friction substantially lower than the coefficient of friction in the material of the pipe and coupling failed to provide a successful solution to the problem. In actual practice, successful couplings have been attained with use of an acrylic resin water emulsion of the type manufactured by Rohm and Haas and marketed under the name of Rhoplex AC-33. The emulsion is applied to clean and dust free coupling grooves with a paint brush or spray and then allowed to air cure. Sufficient material must be applied to the grooves to insure a good film, forming a continuous coating. However, it is to be understood that the above coating or method of application is for illustration purposes only and that the invention is not to be limited to a particular type of coating or method of application.

The instant invention provides a coupling for pipe joints which permits a method of lubricating the various elements not possible in the prior art. In accordance with previous experience, the method for preparing the various elements for joining the ends of the pipe with a fluid tight coupling required lubricating the pipe ends, the rubber ring and the grooves in the pipe coupling. Improper lubrication of any one element could result in the displacement of the rings from the grooves. However, either of the lubricating methods made possible by the instant invention are much simpler. In preparing the elements for a joint in accordance with the instant invention, it is only necessary either to: (1) Lubricate all of the coupling grooves only; or, (2) Lubricate all of the rings only. In previous couplings, such simple lubrication would result in the displacement of the rings from the grooves. However, with grooves coated with a material in accordance with the instant invention, objectional displacement is virtually eliminated. Thus, a distinct advantage is gained by the use of couplings made in accordance with the instant invention. It is to be understood that for the purposes of this invention, the groove may be located on any desirable coupling component where similar problems are involved. For example, it could be located on the internal surface of a female component as explained above, or the groove could be in the outer surface of a male component, such as the pipe end, or the grooves might be located opposite each other in both components, to accommodate the gaskets under compression.

Having thus described the invention in detail, it will be understood that these details need not be strictly adhered to and that various changes and modifications may suggest themselves to one skilled in the art, all falling within the scope of the invention as defined by the subjoined claims.

What I claim is:

1. In a pipe joint formed by seating an annular gasket in at least one annular groove in an internal peripheral surface of a coupling therefor and by exerting sufficient forces on said gasket by relative axial movement between at least one pipe end and said coupling to deform said gasket between said pipe end and said coupling to form a fluid tight seal, and wherein, during said relative movement between said pipe end and said coupling, said gasket being located adjacent one axial end portion of said groove, said pipe end has a tendency to exert on said gasket a force sufficient to displace at least a portion of said gasket from said groove, the combination comprising:
   (a) a coupling having an internal diameter greater than the outside diameter of said pipe end and at least one annular groove formed in the internal peripheral surface thereof;
   (b) an annular resilient deformable gasket having in a relaxed state a generally circular cross-sectional configuration;
   (c) said gasket being seated in said groove with the inner periphery of said gasket extending in a generally radially inward direction a substantial distance out of said groove;
   (d) at least one pipe end adapted to be moved into said coupling and to exert sufficient forces on said gasket to deform said gasket between said pipe end and said coupling to form a fluid tight seal;
   (e) means providing an annularly continuous bearing surface of a substantially rigid material on the surface portion of said coupling at least at said one axial end portion of said groove;
   (f) said means providing an annularly continuous bearing surface being spaced from contact with said pipe end;
   (g) said material having a coefficient of friction substantially lower than the coefficient of friction of the material in said pipe end, said coupling and said gasket to facilitate rotation of at least said portion of said gasket in said groove when subjected to said displacement forces during the relative movement between said pipe end and said coupling whereby to prevent extrusion of said gasket due to said forces tending to displace said gasket.

2. A pipe joint as defined in claim 1 wherein said means providing an annularly continuous bearing surface comprises:
   (a) a coating of substantially rigid material.

3. A pipe joint as defined in claim 1 and further comprising:
   (a) an annular circumferential shoulder on the peripheral surface of said pipe end facing said coupling,
   (b) said shoulder cooperating with said gasket and said one axial end portion of said groove to position said pipe end relative to said coupling.

4. A pipe joint as defined in claim 3 wherein said means providing an annularly continuous bearing surface comprises:
   (a) a coating of substantially rigid material.

5. In a pipe joint formed by seating an annular gasket in each of a plurality of annular grooves in an internal peripheral surface of a coupling and by exerting sufficient force on each of said gaskets by relative axial movement between a plurality of pipe ends and said coupling to deform each of said gaskets between an associated pipe end and said coupling to form a fluid tight seal, and wherein, during said relative movement betwen each of said pipe ends and said coupling, each of said gaskets being located adjacent one axial end portion of each of said grooves, said pipe ends have a tendency to exert on each of said gaskets a force sufficient to displace at least a portion of each of said gaskets from each of said grooves, the combination comprising:
   (a) a coupling having an internal diameter greater than the outside diameter of each of said pipe ends and at least two annular grooves formed in the internal peripheral surface thereof;
   (b) a plurality of annular resilient deformable gaskets having in a relaxed state a generally circular cross-sectional configuration;
   (c) each of said gaskets being seated in one of said grooves with the inner periphery of said gasket extending in a generally radially inward direction a substantial distance out of said groove;

(d) a plurality of pipe ends adapted to be moved into said coupling and to exert sufficient forces on said gaskets to deform said gaskets between said pipe ends and said coupling to form fluid tight seals;

(e) means providing an annularly continuous bearing surface of a substantially rigid material on the surface portions of said coupling at least at said one axial end portion of each of said grooves;

(f) said means providing an annularly continuous bearing surface being spaced from contact with said associated pipe end;

(g) said material having a coefficient of friction substantially lower than the coefficient of friction of the material in said pipe end, said coupling and said gasket to facilitate rotation of at least said portion of said gasket in said groove when subjected to said displacement forces during the relative movement between said pipe ends and said coupling whereby to prevent extrusion of each of said gaskets due to said forces tending to displace said gaskets.

6. A pipe joint as defined in claim 5 wherein said means providing an annularly continuous bearing surface comprises:

(a) a coating of substantially rigid material.

7. A pipe joint as defined in claim 5 and further comprising:

(a) an annular circumferential shoulder on the peripheral surface of each of said pipe ends facing said coupling;

(b) said circumferential shoulders cooperating with each of said gaskets and said one axial end portion of each of said grooves to position each of said pipe ends relative to said coupling.

8. A pipe joint as defined in claim 7 wherein said means providing an annularly continuous bearing surface comprises:

(a) a coating of substantially rigid material.

References Cited in the file of this patent

UNITED STATES PATENTS

| | | |
|---|---|---|
| 1,303,102 | Monrath | May 6, 1919 |
| 1,806,920 | See | May 26, 1931 |
| 2,266,377 | Neely | Dec. 16, 1941 |
| 2,387,872 | Bell | Oct. 30, 1945 |
| 2,437,586 | Aber | Mar. 9, 1948 |
| 2,473,139 | Dickerman | June 14, 1949 |
| 2,562,014 | Buhayar | July 24, 1951 |
| 2,738,992 | Heisler | Mar. 20, 1956 |
| 2,857,184 | Mancusi | Oct. 21, 1958 |
| 2,907,590 | Oswald | Oct. 6, 1959 |

FOREIGN PATENTS

| | | |
|---|---|---|
| 1,114,323 | France | Dec. 19, 1955 |